(12) United States Patent
Heule (10) Patent No.: US 8,540,464 B2
(45) Date of Patent: Sep. 24, 2013

(54) DEBURRING KNIFE FOR DEBURRING EVEN AND UNEVEN HOLE EDGES

(75) Inventor: Heinrich Heule, Au (CH)

(73) Assignee: Heule, ULF, Balgach (CH)

( * ) Notice: Subject to any disclaimer, the term of this patent is extended or adjusted under 35 U.S.C. 154(b) by 1029 days.

(21) Appl. No.: 12/555,297

(22) Filed: Sep. 8, 2009

(65) Prior Publication Data

US 2010/0196111 A1 Aug. 5, 2010

(30) Foreign Application Priority Data

Sep. 9, 2008 (DE) .......................... 10 2008 046 489

(51) Int. Cl.
*B23B 51/00* (2006.01)

(52) U.S. Cl.
USPC ......... 408/154; 408/187; 408/199; 408/239 R (58) Field of Classification Search
USPC ............. 408/231, 233, 239 R, 154, 155, 156, 408/180, 187, 199; 279/76, 79, 83, 86
IPC ...................................................... B23B 51/00
See application file for complete search history.

(56) References Cited

U.S. PATENT DOCUMENTS

| | | | |
|---|---|---|---|
| 2,661,640 A | 12/1953 | Ruegg | |
| 3,008,360 A | 11/1961 | Winberry, Jr. | |
| 3,973,861 A * | 8/1976 | Sussmuth | 408/154 |
| 4,795,290 A * | 1/1989 | Lindberg | 408/224 |
| 5,135,338 A | 8/1992 | Heule | |
| 5,803,675 A | 9/1998 | Von Haas | |
| 5,803,679 A * | 9/1998 | Heule | 408/211 |
| 2007/0269279 A1 * | 11/2007 | Abramson et al. | 408/154 |

FOREIGN PATENT DOCUMENTS

| | | | |
|---|---|---|---|
| DD | 255684 A1 | 4/1988 | |
| DE | 2525872 A * | 12/1976 | |
| DE | 3313007 A1 * | 10/1984 | |

(Continued)

OTHER PUBLICATIONS

Search Report, EP09011529, Oct. 28, 2009, 5 pages.

(Continued)

*Primary Examiner* — Daniel Howell
*Assistant Examiner* — Michael Vitale
(74) *Attorney, Agent, or Firm* — Wood, Herron & Evans, LLP (57) ABSTRACT

Deburring knife for deburring straight or nonround hole edges with a base body driven rotationally around its longitudinal axis, in which one or more bar blades are replaceably accepted into a swivel-mounted knife holder in a base body, by which the knife holder has at least one control recess located on its circumference, in which a spring component engages, which guides the rotation of the knife holder in the base body, characterized by the fact that for pivot bearing of the knife holder in the base body of the knife holder there are two drilled holes located across from one another vertically to the mounting hole of the bar blade, into each of which the end of a bearing bolt engages, whose other end goes into a transverse hole in the base body and serves to rotate the knife holder in the base body that one or more bar blades are thereby easily and replaceably mounted in the radial mounting hole in the knife holder, that at least one stop preventing axial displacement and one pullout safety device for security in the axial direction are in place for the bar blade.

15 Claims, 5 Drawing Sheets

(56) References Cited

FOREIGN PATENT DOCUMENTS

| | | |
|---|---|---|
| DE | 4008533 A1 | 9/1991 |
| DE | 202005018739 | 3/2006 |
| JP | 57008001 A * | 1/1982 |

OTHER PUBLICATIONS

Search Report, EP09011529, Feb. 11, 2010, 9 pages.
Search Report, German Patent Application 102008046489.9 dated Jan. 26, 2010.

* cited by examiner

DEBURRING KNIFE FOR DEBURRING EVEN AND UNEVEN HOLE EDGES

The object of the invention is a deburring knife for deburring even and uneven hole edges according to the generic term in Patent Claim 1.

Such a deburring knife became known through DE 40 08 533 A1, to whose content of revelation reference shall be made. Its revelation shall be completely incorporated into the revelation of the present invention.

This application concerns a deburring tool for deburring straight or nonround hole edges with a base body rotatably driven around its longitudinal axis, and in which one or more bar blades are located in a radially adjustable fashion.

The one or several bar blades can be interchangeably accepted into the knife holder. The knife holder exhibits at least one circumferentially located control recess, in which a spring element is engaged, which directs the knife holder's rotation.

Reference is also made to U.S. Pat. No. 5,135,338 B, whose revelation is also completely incorporated into the content of revelation of the present invention.

Its FIGS. 10 through 15 describe an interchangeable bar blade, which is mounted into a radial hole in a knife holder and is held by a transverse bolt.

A disadvantage of this assembly, however, is that the transverse bolt designated by reference sign 41 serves both to mount the bar blade and to swivel the knife holder 40. The disadvantage lies in the fact that in order to replace a bar blade, the transverse bolt 41 must be removed, by which the knife holder 40 also falls out of its slot.

Only then can the bar blade be taken out of the recess in the knife holder. Installing a bar blade into such a knife holder is even more difficult. For this it is necessary for the transverse hole in the bar blade to be brought into conformance with the transverse hole in the knife holder and that both parts be brought into the tool slot in the tool holder, through which only then the transverse bolt can be inserted into the knife holder, which then also penetrates and mounts the bar blade.

This presents the significant disadvantage that in practice three separate parts must be used to secure the bar blade in the knife holder.

Another disadvantage of the conventional embodiment is that a transverse hole must be made into a bar blade consisting of highly hardened steel. This involves a lot of work, because such a transverse hole can only be introduced through an erosion process.

There is the further disadvantage that such a transverse hole severely weakens the bar blade, so that it can no longer transfer torsion and bending moments.

Thus, altogether the state of the art presents the disadvantage that such a deburring tool can only be produced at relatively high cost.

The task of the invention is therefore basically to improve on a deburring knife according to the object of DE 40 08 533 A1 or U.S. Pat. No. 5,135,338 B, so that the bar blade can be significantly more simply, stably and inexpensively mounted into the tool holder, and so that the deburring tool can be produced at significantly lower cost.

As a solution to the problem posed, the invention is characterized by the technical theory for Claim 1.

A significant characteristic of the present invention is that the bar blade is mounted through a mounting hole in the knife holder, that the knife holder displays two vertically transverse holes running parallel to the mounting hole of the bar blade, in which holes a bearing bolt engages, which performs the swivel with the base body, and that the knife is thereby easily insertably mounted into the radial mounting hole in the knife holder, that at least one positioning bolt and at least one stop edge fits onto the bar blade, and, in addition, that a pullout safety device is located on the knife holder in the area of the mounting hole to secure the bar blade in the axial direction.

In contrast to the state of the art, there is no longer just a single transverse bolt that serves both to swivel the knife holder and to hold the bar blade. Instead, the transverse bolt is replaced by two shorter opposingly located transverse bolts aligning toward one another.

These two transverse bolts also take over the swivel of the knife holder in the base body. However, they no longer serve to hold the bar blade into the knife holder, as in the state of the art. Instead, the bar blade is now only inserted into the mounting hole on the knife holder and is held into this mounting hole with a shift stop and a pullout safety device.

Within the given technical teaching there is the advantage that such a bar blade can be produced less expensively, because it omits the expensively produced transverse hole for the bearing bolt according to the state of the art, and the bar blade is thereby cheaper by a factor of one half than a comparable bar blade according to the object of U.S. Pat. No. 5,135,338 B.

For the purpose of simplification, the following description will proceed from the idea that only a single bar blade is in place. However, the invention is not limited to this. It is also conceivable that two or more bar blades be interchangeably mounted in the knife holder. These bar blades can be located parallel or at an angle to each other and in an opposing position. It is equally possible to use a single bar blade with two opposing heads and correspondingly located cutting edges. Thus the mention that only one bar blade is used is only for simplicity of description.

An advantage of the invention is that the bar blade is now mounted in an easily replaceable manner in its mounting hole in the knife holder, because it simply lies against at least one stop edge and an associated stop edge on the knife holder.

In a preferred embodiment of the present invention, a stop edge on the knife holder side (housing side) is set up with a positioning bolt, which lies against an associated stop edge on the rear side of the bar blade.

However, the invention is not limited to this.

In another embodiment of the invention, it is conceivable that a notch be located on the bar blade and that the tip of a locking screw engage in this notch and can be screwed into an associated threaded hole in the knife holder. In this way, the bar blade can also be held by such a locking screw.

However, it is preferred that the shift stop be located at the rear end of the bar blade. However, the invention is not limited to this. In another embodiment, a shift stop can be fastened (somewhere) on the housing side to a stop edge in the area of the bar blade to limit the inward slide movement, as well as to establish the end position of the bar blade.

It is also possible, instead of one locking screw to use two, whereby one locking screw serves as the pullout safety device for the bar blade in the axial direction and the other locking screw serves as the axial stop for sliding the bar blade into the mounting hole.

In a preferential embodiment of the present invention, however, the pullout safety device is preferentially formed as a spring pin that is mounted in a transverse hole with full flexibility, which transverse hole is made somewhat parallel to the two drilled holes for the bearing bolts for mounting the knife holder.

A spring pin is inserted into this transverse hole and is mounted with associated disk-shaped spring pin mounts to the right and left, so that it can centrally bend.

It lies centrally on the underside of the bar blade and engages there flexibly in a notch on the underside of the bar blade, so that the spring pin engages in this notch under spring prestress and thereby forms an axial pullout safety device for the bar blade.

As already mentioned, instead of a flexible pullout safety device, a locking screw can also be used, whereby the locking screw's threaded hole passes vertically to the transverse hole for mounting the spring pin.

The spring pin can also be replaced with other spring elements, such as with compression springs, elastic inserts and similar things, because what really matters is assuring the simplest axial pullout safety device for the bar blade.

The spring pin does not necessarily have to be made of metallic spring material. It can also be made from an elastically flexible plastic pin. Instead of the bending springs described here, other spring elements, such as leg springs, screw pressure springs and similar components, can be used.

In a third embodiment, it is possible that a screw pressure spring would not press in on the underside notch on the circumference of the bar blade, but that an index ball be in place, which is engaged under prestress by the screw pressure spring into the associated notch on the underside of the bar blade.

In a fourth embodiment it is provided that the holding notch on the bar blade be replaced by a "snap" groove. The bar blade can be positioned in this notch with a simple C-form spring. This combination contains the stop that limits the slide and a pullout safety device in a single component. In this case, the bar blade would even have to be pushed outward toward the back (against the direction of extraction).

Thus, replacement of the bar blade according to the invention in the knife holder is especially simple in all of the four embodiments described. That is to say that for replacement it is sufficient simply to grip the bar blade with an appropriate tool and pull the bar blade out of the mounting hole in the direction of its length extension. It is also possible to press the bar blade out from behind, because the mounting hole in the knife holder completely penetrates the knife holder and therefore the rear side of the face of the bar blade is reachable from behind with a tool, which pushes the bar blade forward out of the mounting hole.

In another preferential embodiment of this invention, it is provided that the mounting hole in the knife holder no longer be formed as a rigid mounting hole, but feature a flexible clamping gap.

Thereby the knife holder is formed with its mounting hole 20 penetrating the knife holder crosswise as a clamping element. This clamping element has a clamping gap that spans approximately two thirds the total axial length, and which divides the knife holder and the mounting holes located in it into two associated clamp halves that are associated and lie symmetrically against each other.

When the bar blade is inserted, the clamping gap is pressed apart, because the exterior circumference of the bar blade is slightly larger than the interior circumference of the mounting hole. This spreads the mounting hole under the spring force of the two clamp halves that lie opposite one another and close flexibly, so that the bar blade is accepted into the mounting hole of the knife holder and clamped. This provides the advantage that, in the execution example according to the execution shown in FIGS. 1 through 11, which works with a spring pin mount, it can be omitted. In this execution the spring pin mount is omitted completely and is replaced with a flexibly formed knife holder.

This allows individual parts of the holder to be dispensed with, and the deburring knife's mounting is simpler and safer to operate.

Since the spring pin mount can be omitted, there is now the additional advantage that knife holder formed as a clamping element can be made considerably smaller, i.e., can be miniaturized. The outer diameter of such a clamping knife holder can be minimized to 4 mm, which in previous knife holders according to FIGS. 1 through 11 isn't possible without difficulty, because in this very small knife holder still more individual parts (spring pin mounts) must be built in. That is omitted from this embodiment.

However, the size indication of a 4 mm diameter should not be understood as the limit for the execution example, but it should offer only a guiding principle as to how small a bar blade can be mounted in such a knife holder. It is even possible to reduce the diameter even further, because it has a one-piece body, in which no further individual parts need to be built, except for the bearing bolt's positioning bolt.

Furthermore, in all execution examples of this invention, no role is played by the fact that the mounting hole is located centrally in the knife holder.

In another embodiment of the invention, it can also be provided that this mounting hole be formed acentrically, i.e., shifted to an upward or downward location on the central longitudinal axis in the knife holder.

In another embodiment of the invention, it can be provided that the clamp slot that divides the knife holder into two clamp halves symmetrically located to one another is not located symmetrically to the central longitudinal axis of the knife holder, but also eccentrically, e.g., is located upward or downward away from the central longitudinal axis. The two clamp halves are therefore no longer symmetrical toward one another, but asymmetrical.

The object of this invention arises not only from the object of the individual patent claims, but also from the combination of the individual patent claims together.

All of the documentation, including the summary of disclosed data and characteristics, especially the spatial design depicted in the drawings, are claimed to have significance as inventions, as long as they are new individually or in combination in relation to the state of the art.

Below, the invention will be explained in more detail by means of several drawings that depict only one manner of execution. In connection with this, further significant characteristics and advantages significant to the invention arise from the drawings and their descriptions.

Depicted are.

Figure 1:
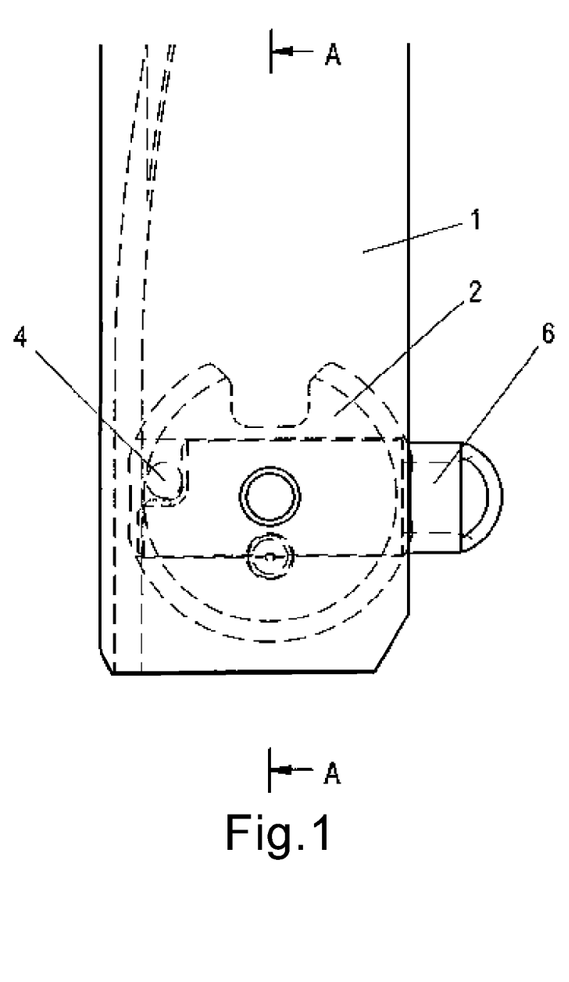
FIG. 1: Partial section of a deburring tool with a tool holder, a knife holder mounted rotatably inside it, and an associated bar blade.
Figure 2:
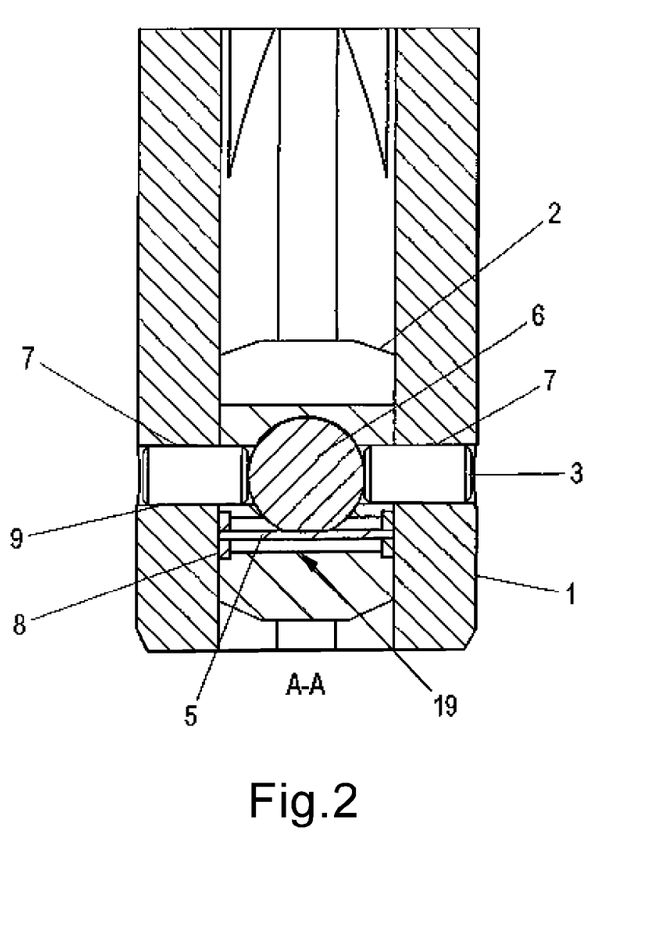
FIG. 2: Section according to line A-A in FIG. 1.

In FIGS. 1 and 2 a general representation of a base body 1 is shown, which is a part of a deburring tool, whose base body 1 has a longitudinal recess 21, in which the knife holder 2 is installed and is mounted there rotatably over two replaceably held bearing bolts 3 that are aligned opposite one another.

The knife holder 2 is flush and interlocking, but is mounted rotatably with slight radial play in the longitudinal recess 21 of the base body.

As can be seen in FIGS. 1 and 2, a bar blade 6 is inserted into a transverse mounting hole 20 in the knife holder 2 and is secured there against axial removal with the help of the pullout safety device 19.

In order to slide in, the bar blade 6 lies in the mounting hole 20 with two stop edges 16, 17 placed backward from one another in a 90° angle against an associated positioning bolt 4.

The positioning bolt forms a sort of high-load transfer axial safety stop for the bar blade 6, because on the one hand it serves to provide rotation protection and on the other hand displacement protection for the bar blade 6 in the mounting hole.

In the execution example shown, the pullout safety device 19 is formed by a spring pin 5 that is inserted into an associated transverse hole 12 in the knife holder 2.

Radial play is achieved by the fact that on both sides the spring pin is inserted into an associated spring pin mount 8. The spring pin mounts 8 are formed as simple disks that go into each end of the spring pin 5. The spring pin 5 is thereby flexibly mounted in the transverse hole 12 as a centrally bendable bending spring.

Figure 6:
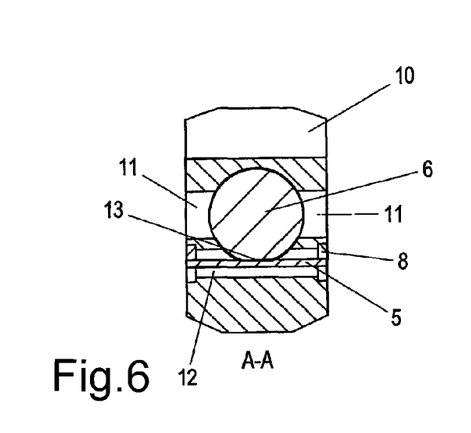
FIG. 6: Section through the knife holder according to line A-A in FIG. 5.
Figure 7:
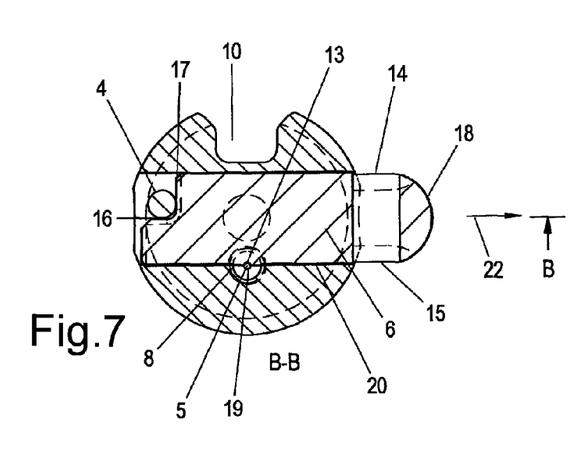
FIG. 7: Section through the knife holder according to line B-B in FIG. 4.

According to FIG. 6, it lies on the underside of the bar blade 6, which is flattened there and forms a holding notch.

Both bearing bolts 3 are mounted securely against shifting in the associated transverse hole 7 in the base body 1 and engage on both sides in the associated drilled hole 11 in the knife holder 2.

This ensures a precise relationship and play when swiveling the knife holder 2 in the base body 1.

For example, the bearing bolts 3 are stopped from falling out by an adhesive layer 9 on the front side of the knife holder 2 in the area of the transverse hole 7.

Instead of an adhesive layer, other means could be used, such as pressing the bearing bolt 3 into the associated transverse hole 7 in the base body 1.

In principle, the bearing bolts 3 must not be replaced, because it is a characteristic of this invention that the knife holder 2 and its swivel always stay in the base body 1 and only the bar blade 6 is replaceable.

If, however, a knife holder 2 is replaced, the bar blade 6 can be simply pulled out by overcoming the pullout safety device, which frees the mounting hole 20. Then the bearing bolt 3 can easily be knocked out, because one blow to one of the individual bearing bolts will drive it through mounting hole 20, make it meet the opposing bearing bolt 3 and drive that one also out of its transverse hole 7 in the base body 1.

In the familiar manner, the knife holder 2 has a control recess 10 on its outer circumference, in which a bending spring (not described in further detail) engages and guides the rotation of the knife holder 2 in the base body.

The bar blade 6 has cutting edges 14, 15 that lie against one another, and the face is formed by a floating radius 18.

In accordance with easy replaceability, an important aspect of this invention is the bar blade 2, because simply pulling in the direction of the arrow 22 on the bar blade 6 bends the spring pin 5 through, removes it from the holding notch 13 and thus the bar blade 6 can be pulled out in the direction of the arrow 22 from the mounting hole 20 in the knife holder 2.

Instead of the positioning bolt 4 shown here, which lies against two vertical centering edges 16, 17 standing toward one another, other means of centering can also be used. For example, on the upper side of the bar blade, the positioning bolt 4 can engage in an associated stop edge, or it could also lie in a designated vertical position on another place on the bar blade 6.

FIGS. 8 through 11 show another embodiment for mounting a bar blade 6 in a knife holder 2. Here the pullout safety device and the stop limit are combined into one part. A C-shaped spring 25 is located in the transverse hole 7 and with its central contact tongue 29 lies against the interior side of a holding notch 33 angled in the direction of extraction 30. According to FIG. 10, the left flank 30 of the holding notch 33 is essentially oriented vertically to the direction of extraction 30, while the right flank 24 leans at an angle to the direction of extraction 30.

Figure 8:
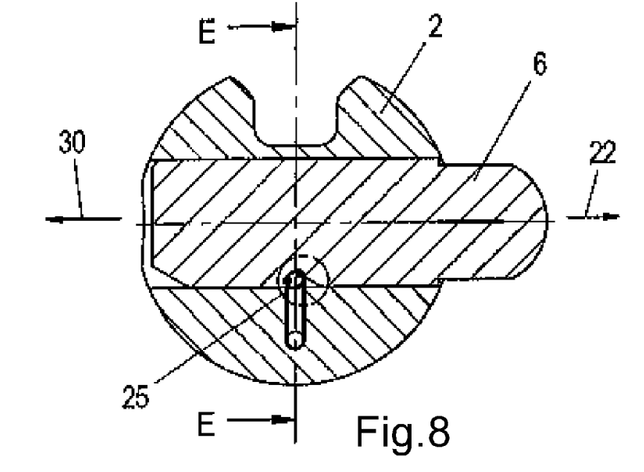
FIG. 8: A section of a varied execution with a stop limit and a pullout safety device in a single part.
Figure 9:
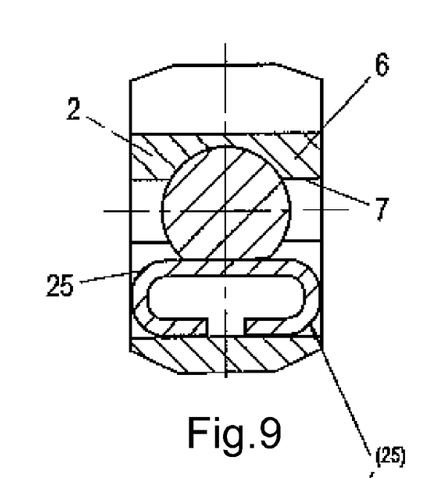
FIG. 9: The section from FIG. 8 rotated 90 degrees.
Figure 10:
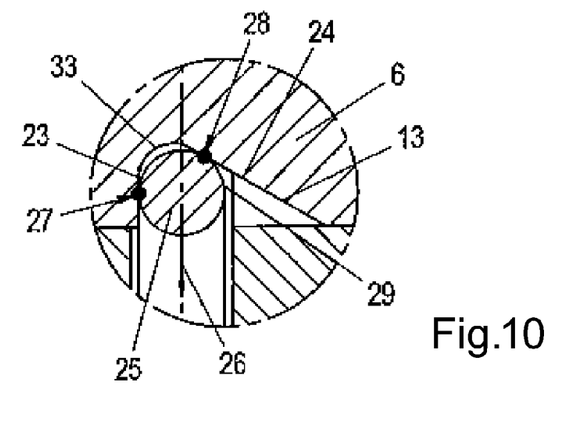
FIG. 10: An enlarged detail view of FIG. 8.

This leads to the fact that the stress of the bar blade 6 in the direction of the arrow 22 of the contact tongue 29 exerts itself on the left stop 27 of the flank 23 so that it is impossible to pull the bar blade in this arrow direction.

Figure 11:
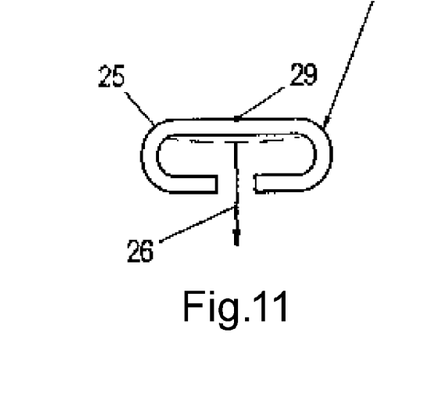
FIG. 11: An enlarged detail view of the C-shaped spring used.

On the other hand, if the bar blades 6 are switched, then the bar blade 6 moves in the direction of extraction 30 and the central contact tongue 29 slides on the right stop 28 along the holding notch 33 and will be deflected downward by the spring deflection 26. This brings the contact tongue 29 out of engagement with the holding notch 33, and the bar blade can be pulled out of the knife holder 2 in the direction of extraction. The shape of the C-shaped spring 25 and the bending through of the central contact tongue 29 are shown in FIG. 11.

FIGS. 12 through 17 depict a knife holder whose basic characteristics are in accordance with the knife holder 2 in FIGS. 1 through 11. Therefore the same reference signs have been used for the same parts.

In particular, the bar blade 6 with the bearing bolt 3 is held in the same manner, by comparison, as in the execution example according to FIGS. 1 through 11.

The difference between these aforementioned execution examples is now shown in FIGS. 12 through 15 in that the knife holder 2 no longer has a clamping gap 38 running about two-thirds of the total length, so that now the knife holder 2 is formed as a clamping element.

Figure 12:
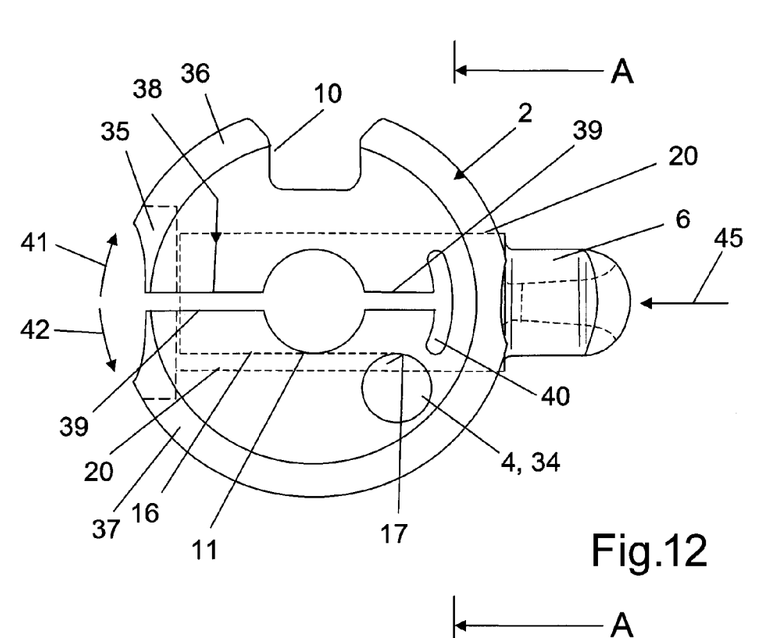
FIG. 12: A section of a second embodiment of a knife holder.
Figures 13, 14:
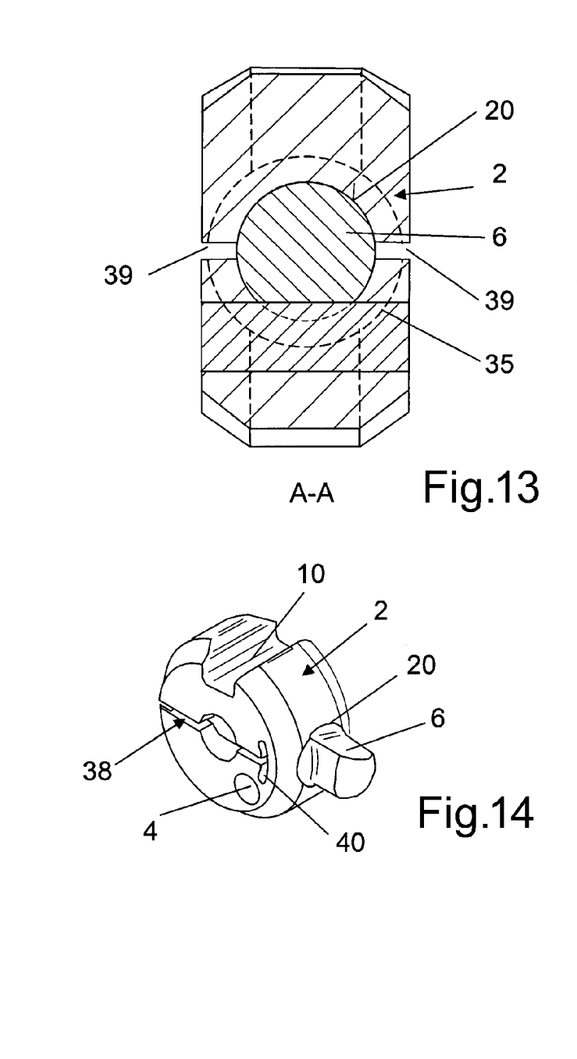
FIG. 13: Section according to line A-A in FIG. 12.
FIG. 14: The perspective view of the knife holder according to FIGS. 12 and 13.

The clamping gap 38, which is open on one side, spans from one side of the knife holder in the form of a longitudinal slot 39, which passes over the drilled hole 11 for inserting the bearing bolt 3 and intersects this drilled hole 11.

On the other side of this drilled hole 11, the clamping gap 38 proceeds in the form of a clamping slot 39 and there ends in an extension 40, which runs crosswise to the longitudinal axis of the longitudinal slot 39. This extension 40 can have a vastly alterable shape and should only remove breaking stress on the end of the longitudinal slot 39 when spreading the two clamp halves 36, 37. This means that the extension can also be formed straight, bow-shaped or also as a hole, one of whose sides moves open into the longitudinal slot 39.

The bar blade 6 is inserted from the front (i.e., from the right side in FIG. 12) in the direction of its longitudinal axis into the mounting hole 20, which is now formed as a clamping mounting hole, by which the two clamp halves 36, 38 spread out from one another, because the exterior diameter of the bar blade 6 is slightly larger in comparison to the interior diameter of the mounting hole 20.

To ease insertion of the bar blade 6 into the mounting hole 20, in the area of a rear recess 35 a spreading tool is installed, which spreads the two clamp halves 36, 37 in the direction of the arrow 41, 42, so as to enlarge the diameter of the mounting hole 20 and thereby enable smooth, secure insertion of the bar blade 6.

Securing against an axial limit during insertion of the bar blade 6 is achieved here by the positioning bolt 4 mentioned above relative to the other embodiments, which now is inserted into a drilled hole 34, which now is located in the front part of the knife holder and no longer in the rear part, was described for the other embodiments according to FIGS. 1 though 11.

In this way the positioning bolt 4 forms a stop on the stop edge 17 of the bar blade 6, so that this is secured against axial penetration.

The positioning bolt 4 with the stop edge 17 also serves to axially limit and position the bar blade 6 during its insertion in the direction of the arrow 45 into the mounting hole 20.

The clamping gap 38 serves to secure against being pulled out axially in the opposite direction from the direction of the arrow 45; it closes the mounting hole 20 in such a way that the bar blade 6 is clamped into the mounting hole 20.

Figure 15:
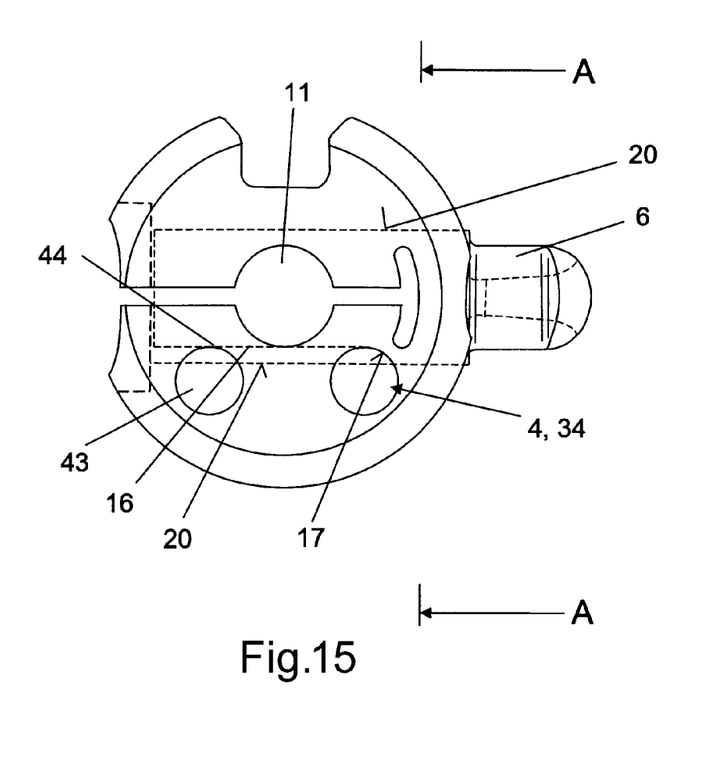
FIG. 15: Another embodiment of a knife holder in comparison to FIG. 12.
Figure 16:
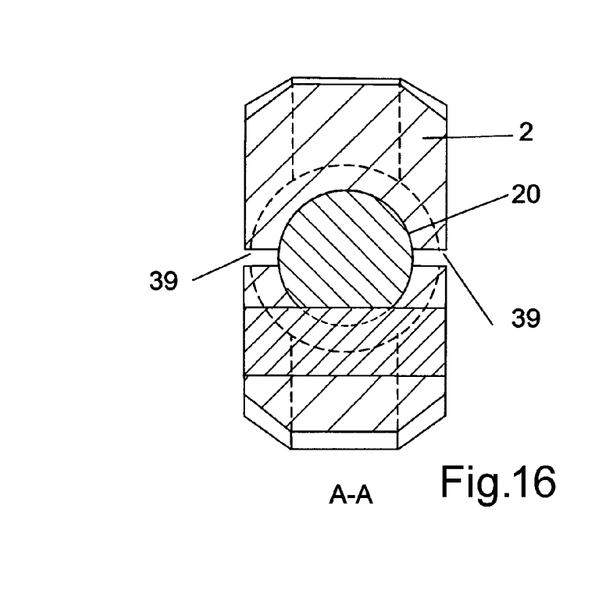
FIG. 16: A section of the execution according to FIG. 15 in the direction of line A-A.
Figure 17:
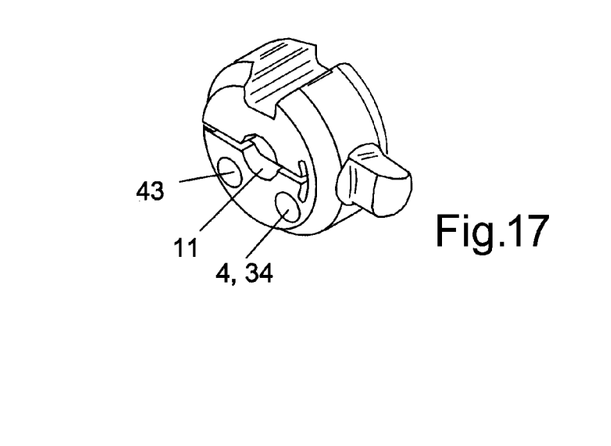
FIG. 17: A perspective view of the knife holder according to FIGS. 15 and 16.

As further security against falling out in the direction opposite to the direction of the arrow 45, a further method is shown in FIGS. 15 through 17, by which a bolt is inserted into one hole 43 in one of the clamp halves 37 of the knife holder 2, which intersects one holding notch 44 on the circumference of the bar blade 6, so that the bar blade is absolutely secure against axial displacement. The ring surface can circle the circumference of the bar blade or also just be located partially on the circumference of the bar blade.

The ring surface can also be provided by a flattening or a flat spot that is located on the circumference of the bar blade and holds the bar blade secure against rotation. As before, the rotation security of the bar blade is achieved with a positioning bolt 4 in connection with the stop edge 17, and further security against axial shifting is achieved using the aforementioned bolt, which is inserted into the drilled hole 43 and which intersects the holding notch 44 on the circumference of the bar blade, so provides it additional security against axial displacement.

In another embodiment it can also be provided that the positioning bolt 4 be omitted and instead only a bolt would be placed in the drilled hole 43.

Figures 3, 4, 5:
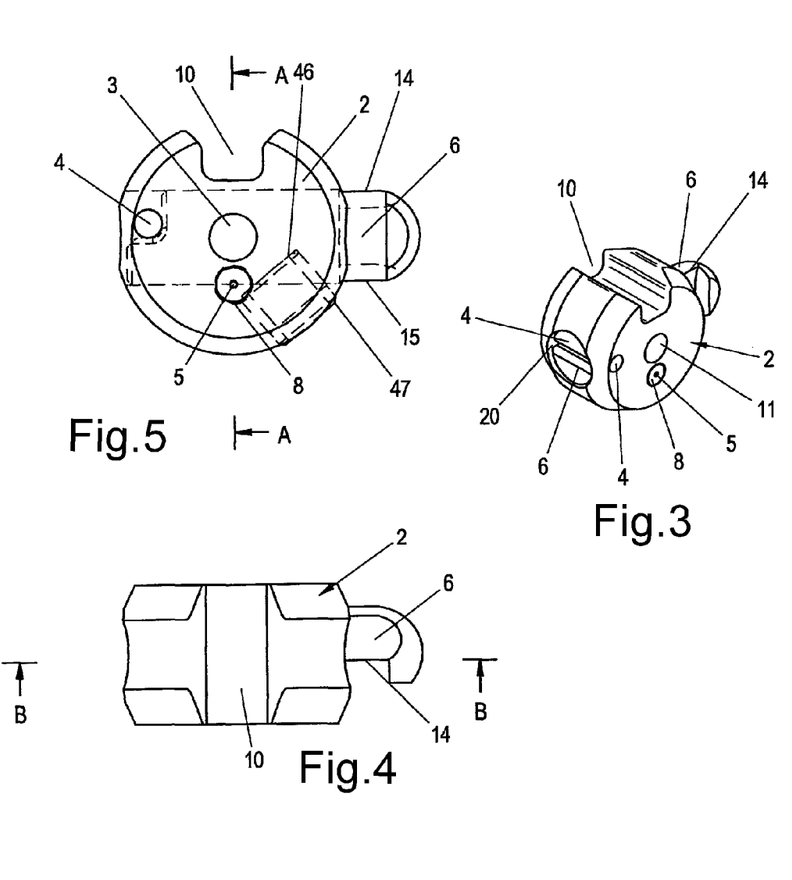
FIG. 3: A perspective view of the knife holder.
FIG. 4: Top view of the knife holder per FIG. 3.
FIG. 5: Lateral view of the knife holder per FIGS. 3 and 4.

As previously mentioned, and referring now back to FIG. 5, it is conceivable that a notch 46 be located on the blade 6 and that the tip of a locking screw 47 engage in this notch 46. The locking screw 47 can be screwed into an associated threaded hole in the blade holder 2. In this way, the blade 6 can also be held by such a locking screw 47. Alternatively, and as also previously mentioned, it is possible that the screw 47 would not directly engage the notch 46 on the blade 6. Rather, an index ball, which is biased by a prestressed spring acted upon by the screw 47, could be used such that the spring biased index ball engages the notch 46 on the blade 6.

Key To Drawings 1. base body
2. knife holder
3. bearing bolt
4. positioning bolt
5. spring pin
6. bar blade
7. transverse hole (in 1)
8. spring pin
9. adhesive layer
10. control recess
11. drilled hole (for 3)
12. transverse hole
13. holding groove
14. cutting edge
15. cutting edge
16. centering edge
17. stop edge
18. floating radius
19. pullout safety device
20. mounting hole (for 6)
21. longitudinal recess
22. direction of arrow
23. flank (left)
24. flank (right)
25. C-shaped spring
26. spring deflection
27. stop (left)
28. stop (right)
29. contact tongue
30. direction of extraction
33. holding groove
34. drilled hole for positioning bolt 4
35. recess for tool
36. clamp half
37. clamp half
38. clamping gap
39. longitudinal slot
40. extension
41. direction of arrow
42. direction of arrow
43. drilled hole
44. holding groove in 6
45. direction of arrow

The invention claimed is:

1. Deburring tool for deburring straight or nonround hole edges with a base body driven rotationally around its longitudinal axis, in which one or more blades are replaceably accepted into a swivel-mounted blade holder in the base body, the blade holder having at least one control recess located on its circumference, in which a spring component engages, which guides the rotation of the blade holder in the base body, wherein for pivot bearing of the blade holder in the base body the blade holder has two drilled holes located across from one another on opposite sides of a mounting hole in the blade holder which receives the blade, into each of which the end of a bearing bolt engages, whose other end goes into a transverse hole in the base body and that one or more blades are thereby easily and replaceably mounted in the blade holder, at least one stop prevents axial displacement of the blade and one pullout safety device provides security in the axial direction for the blade.

2. Deburring tool according to claim 1, wherein the stop edge on the blade holder side is formed by a positioning bolt, which lies against an associated stop edge of the blade.

3. Deburring tool according to one of the claims 1 or 2, wherein the axial pullout safety device is formed by a notch on the blade, in which the tip of a locking screw located on the side of the blade holder engages.

4. Deburring tool according to one of the claims 1 or 2, wherein the pullout safety device is formed as an index ball prestressed under spring tension, which engages under pretension from the screw pressure spring into an associated notch on the underside of the blade.

5. Deburring tool according to claim 2, wherein the positioning bolt forms a high-load transfer axial safety stop for the blade, which on the one hand serves to provide rotation protection and on the other hand displacement protection for the blade in the mounting hole.

6. Deburring tool according to one of the claims 1 or 2, wherein both bearing bolts are mounted securely against shifting in the associated transverse hole in the base body and engage on both sides in the associated drilled hole in the blade holder.

7. Deburring tool according to one of the claims 1 or 2, wherein that the axial pullout safety device and the axial stop limit are combined into one part as a holding notch.

8. Deburring tool according to claim 7, wherein the part is formed as the holding notch is diagonally beveled in the direction of extraction in the blade, in which a spring engages in the transverse hole.

9. Deburring tool according to claim 8, wherein one flank of the holding notch is oriented vertically to the direction of extraction, while the other flank is oriented diagonally to the direction of extraction.

10. Deburring tool according to claim through 8, wherein for replacement of the blade a movement is made in the direction of extraction and the central contact tongue of the spring glides along the right stop of the holding notch and is there diverted downward by spring deflection, by which it comes out of engagement with the holding notch.

11. Deburring tool for deburring straight or nonround hole edges with a base body driven rotationally around its longitudinal axis, in which one or more blades are replaceably accepted into a swivel-mounted blade holder in the base body, the blade holder having at least one control recess located on its circumference, in which a spring component engages, which guides the rotation of the blade holder in the base body, wherein for pivot bearing of the blade holder in the base body the blade holder has two drilled holes located across from one another on opposite sides of a mounting hole in the blade holder which receives the blade, into each of which the end of a bearing bolt engages, whose other end goes into a transverse hole in the base body and that one or more blades are thereby easily and replaceably mounted in the blade holder, at least one stop prevents axial displacement of the blade and one pullout safety device provides security in the axial direction for the blade,
  wherein the pullout safety device is in the form of a spring pin, which is flexibly mounted in a transverse hole in the blade holder and engages in a holding notch on the blade under spring pretension.

12. Deburring blade holder adapted to be pivotally mounted to and rotationally driven by a base body of a deburring tool, said blade holder further adapted to have at least one deburring blade removably mounted therein, said blade holder having at least one control recess located on a circumference of said blade holder, said control recess adapted to receive a spring therein to bias said blade holder to a deburring position, said blade holder having a mounting hole extending therein into which is received the deburring blade, said mounting hole configured so as to clamp the deburring blade in said blade holder.

13. Deburring blade holder adapted to be pivotally mounted to and rotationally driven by a base body of a deburring tool, said blade holder further adapted to have at least one deburring blade removably mounted therein, said blade holder having at least one control recess located on a circumference of said blade holder, said control recess adapted to receive a spring therein to bias said blade holder to a deburring position, said blade holder having a first mounting hole extending therein into which is received the deburring blade, said first mounting hole having a flexible clamping gap to clamp the deburring blade in said blade holder.

14. Deburring blade holder according to claim 13 wherein said clamping gap, which is open on one side, spans from one side of said blade holder in the form of a longitudinal slot, which passes over a second mounting hole in said blade holder for receiving a bearing bolt for mounting said blade holder to the base body and intersects said second mounting hole.

15. Deburring blade holder according to one of the claims 13 or 14 wherein said blade holder further includes a rear recess relative to said clamping gap whereby a spreading tool can be installed to spread said clamping gap to ease insertion of the deburring blade into said first mounting hole so as to enlarge the diameter of said first mounting hole and thereby enable smooth, secure insertion of the deburring blade.

\* \* \* \* \*

UNITED STATES PATENT AND TRADEMARK OFFICE
CERTIFICATE OF CORRECTION

PATENT NO. : 8,540,464 B2  
APPLICATION NO. : 12/555297  
DATED : September 24, 2013  
INVENTOR(S) : Heinrich Heule Page 1 of 1

It is certified that error appears in the above-identified patent and that said Letters Patent is hereby corrected as shown below:

In the Specification

Column 4, line 24 reads: "provided that this mounting hole be formed acentrically, i.e.,"; it should read: -- provided that this mounting hole be formed eccentrically, i.e., --.

In the Claims

Column 9, line 14, Claim 7 reads: "wherein that the axial pullout safety device and the axial stop"; it should read: -- wherein the axial pullout safety device and the axial stop --.

Column 9, line 24, Claim 10 reads: "10. Deburring tool according to claim through 8, wherein"; it should read: -- 10. Deburring tool according to claim 8, wherein --.

Signed and Sealed this  
Seventh Day of July, 2015

Michelle K. Lee  
*Director of the United States Patent and Trademark Office*